Oct. 4, 1932.  J. S. BARNES ET AL  1,880,666
BORING MACHINE
Filed May 11, 1927  3 Sheets-Sheet 1
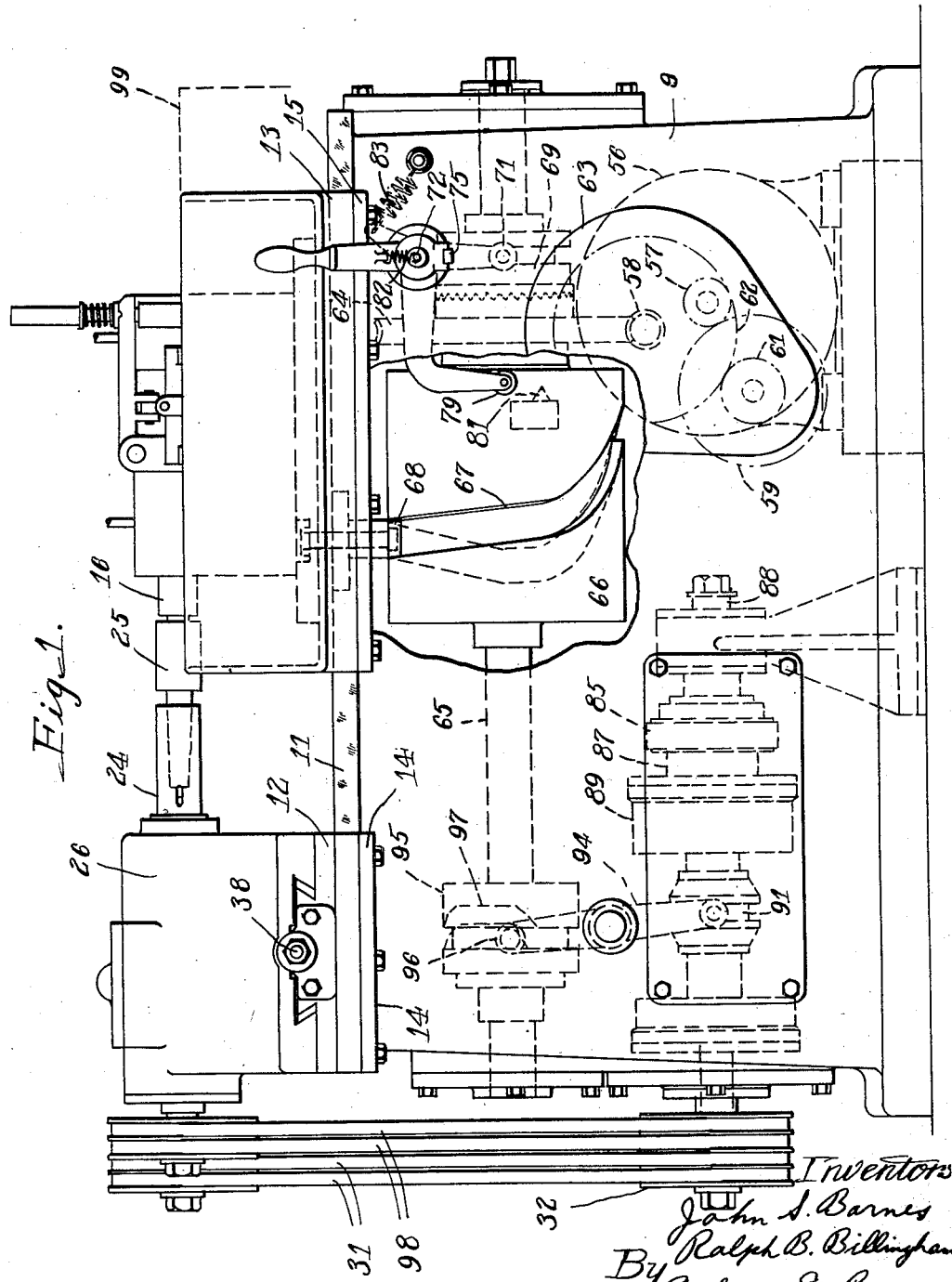

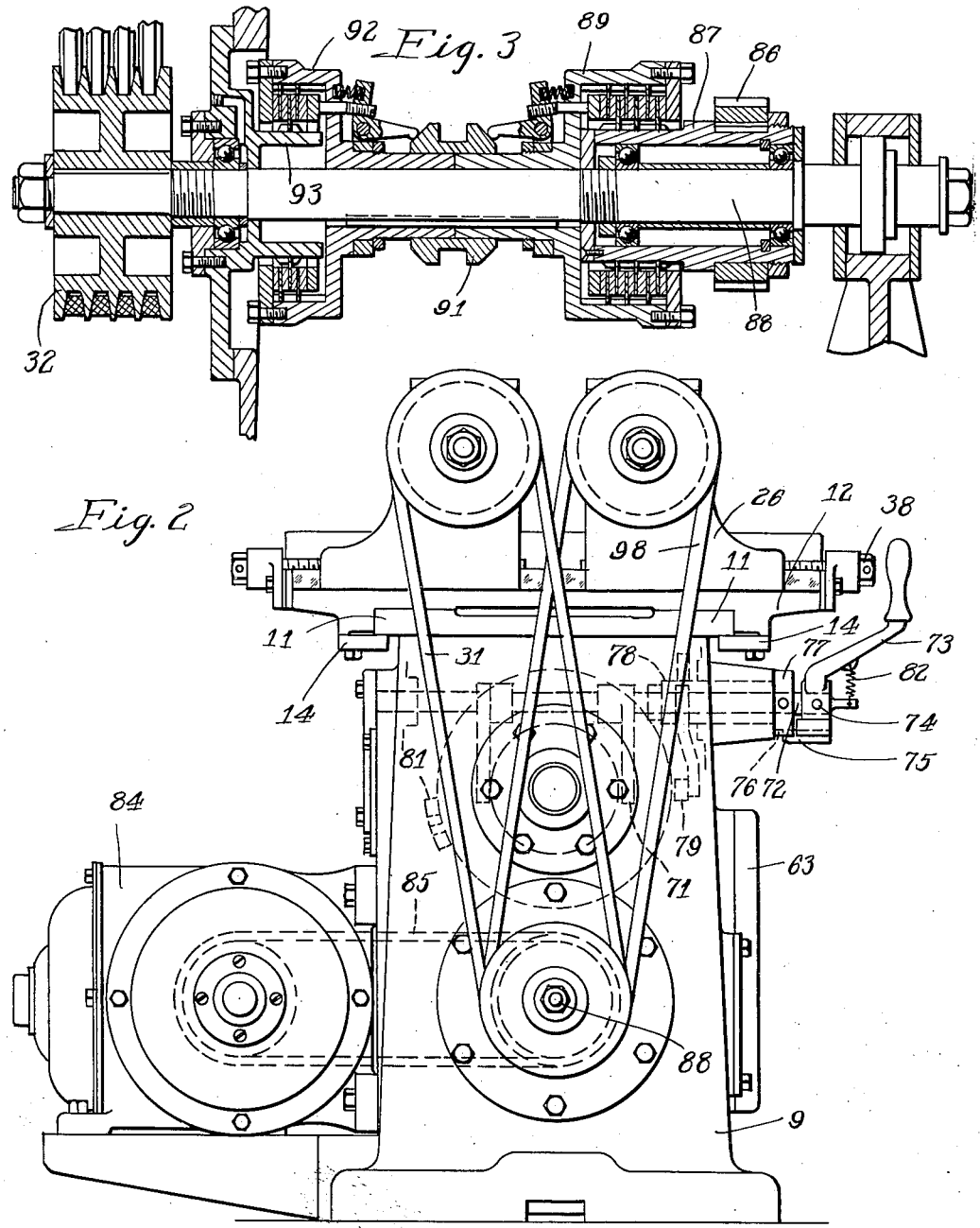

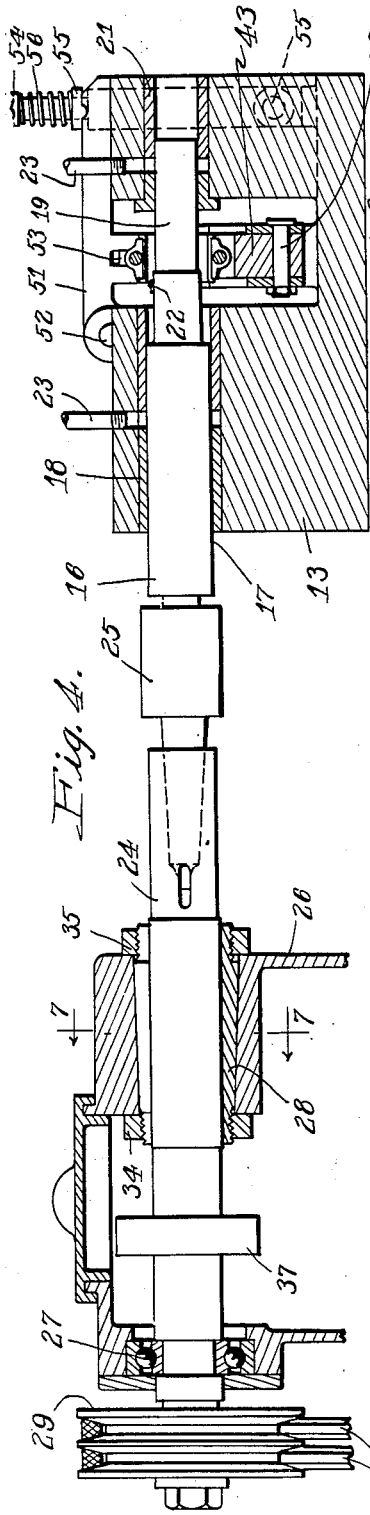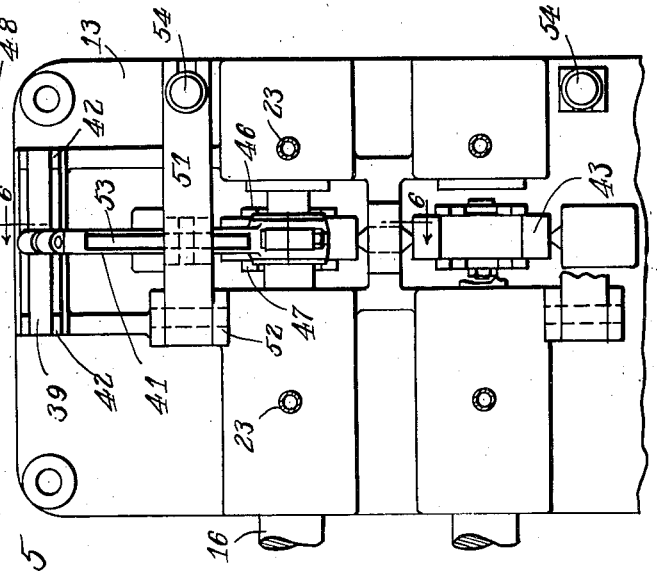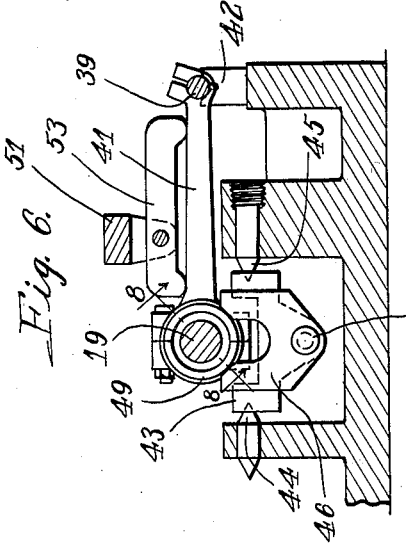

Patented Oct. 4, 1932

1,880,666

UNITED STATES PATENT OFFICE

JOHN S. BARNES AND RALPH B. BILLINGHAM, OF ROCKFORD, ILLINOIS, ASSIGNORS TO W. F. AND JOHN BARNES COMPANY, OF ROCKFORD, ILLINOIS, A CORPORATION OF ILLINOIS

BORING MACHINE

Application filed May 11, 1927. Serial No. 190,409.

This invention relates to boring machines and is here illustrated as applied to that class employing a diamond boring tool.

The primary object of our invention is to provide an improved machine of this kind especially designed for work requiring a high degree of accuracy. More particularly, our improvements are adapted for the automotive industry where adherence to close dimensions in the manufacture of parts in large quantities is required. This is exemplified in the application of our invention to boring the wrist pin and crank shaft bearings of a connecting-rod, for which job the machine illustrated herein is designed.

Heretofore in the boring of connecting-rod bearings considerable difficulty has been experienced in that the finished bore was not true round and the bores at the opposite ends were not parallel. Bearings having oval or other characteristics are obviously objectionable; and bearings not parallel cause a lapping action of the pistons, engine noise, excessive wear, and other troubles. While various attempts have been made and special machines built with a view to accomplishing the desired results they have not so far as we are aware been altogether satisfactory. Therefore, in providing an improved diamond-tool boring machine the present invention contemplates a practical solution of the problem of boring connecting-rod bearings or any parts in which similar problems are involved.

In furtherance of the foregoing we have aimed to provide a new combination or organization of parts characterized by a horizontal boring bar in combination with a special type of fixture. By reason of this new combination and method of manufacture, all of which will be explained more fully hereafter, we secure accurate location of the connecting-rod without subjecting it to internal strains or stresses and cause the boring tool to be fed and guided in such manner as to perform its boring operation to a high degree of accuracy and precision. In providing a horizontal machine we have aimed to eliminate vibration and to prevent jerky action in the feed movement, thus overcoming some of the objections to a vertical machine which has considerable suspended weight the action and control of which are not conducive to the degree of accuracy required in diamond-tool boring of this kind. We have also aimed to provide for adjustment of the spindles in case plural spindles are required, and have made spaced safety provision in the spindle mounting to prevent breakage which might result from a jamb of the boring tool bar, or from other causes. Another feature is the method of mounting and driving the boring bar in combination with the method of locating and supporting the work-piece. We have further provided improved driving mechanism for the spindles and improved feed mechanism for the work-fixture, particularly suited to automatic control or operation of these parts in timed relation.

Another object of our invention is the provision in a boring machine of automatic control of the relative movements between the work fixture and the spindle saddle in a cycle comprising rapid approach, feed and return movements, together with such movements for automatically causing the spindles to be put into rotation at a predetermined time and continued in rotation throughout the feed and then automatically stopped and positively held against rotation during said return. This phase of our invention is not limited to diamond-tool boring machines, but is applicable to any boring machine in the combination claimed hereinafter.

Other objects and attendant advantages will be appreciated by those skilled in this art as the invention becomes better understood by reference to the following description when considered in connection with the accompanying drawings, in which, Figure 1 is a front elevation of a diamond-tool boring machine, partly broken away, embodying our invention;

Fig. 2 is an end view of the machine, looking at the spindle driving end;

Fig. 3 is an enlarged longitudinal section through the clutch and brake spindle driving mechanism shown mostly in dotted lines in the lower left hand corner of Fig. 1;

Fig. 4 is a fragmentary longitudinal vertical section through one of the spindles, its diamond-tool boring bar, and the fixture;

Fig. 5 is a fragmentary top view of the fixture;

Fig. 6 is a vertical section taken substantially on the line 6—6 of Fig. 5; and, Figs. 7 and 8 are detail sections taken on the lines 7—7 and 8—8 of Figs. 4 and 6, respectively.

The drawings show our invention as applied to boring the crank shaft bearing of a connecting-rod. The machine may be designed for one or more boring bars, the present drawings showing a two bar machine, each boring bar being adapted for the same operation. It should be understood therefore that these drawings are illustrative merely and that our invention may be embodied in other forms.

The frame, designated generally by 9, serves as base and a housing and is equipped on its top with flat horizontal ways 11 extending from end to end. These ways provide a broad flat mounting for a spindle carriage 12 and a fixture carriage 13. The spindle carriage is normally clamped in a fixed position by gibs 14 with just sufficient pressure to hold the carriage in the proper working position and to permit slippage in case of excessive back pressure on the spindles, as will be explained later. The fixture carriage likewise has gibs 15 holding it from displacement, but it is free to slide back and forth on the ways 11 for the purpose of carrying the work-piece in rapid approach, feed, and return movements with respect to the diamond-tool boring bars which are driven at a high speed by spindles mounted on the carriage 12.

Referring more particularly to Figs. 4, 5, and 6, the construction of but one boring bar, its driving spindle and work-fixture will be described, since the other boring bar and its co-operating parts are of the same construction. As shown in Fig. 4, the boring tool designated generally by 16 has a cylindrical portion 17 mounted for rotation and reciprocation in a sleeve bearing 18 carried by the fixture 13, a reduced cylindrical portion 19 similarly journaled in a sleeve bearing 21 mounted on the fixture in spaced coaxial relation to the bearing 18, and a diamond cutting edge 22 fixed to the bar between the journal portions 16 and 19. Lubricant under pressure is supplied through pipes 23 to the boring bar bearings in the sleeves 18 and 21, thus providing a thin film of oil about both the main and the pilot bearing portions 17 and 19 respectively. This film of oil is essential in this construction in view of the high speed of rotation and because of the close fit in the sleeve bearings required in order to secure the desired accuracy in the action of the boring tool.

The boring bar is driven by a spindle 24 through the intermediary of an Oldham coupling 25. The spindle is journaled in a saddle 26 by means of a radial and thrust bearing 27 and a sleeve bearing 28 of substantial length. On the far end of the spindle is fixed a double groove pulley 29 adapted to be driven by flexible belts 31 from a drive pulley 32 which will be described later. The spindle mounting is so designed as to reduce vibration, it being noted that the bearing 27 takes care of the thrust and radial load caused by the driving action on the pulley 29 and the long sleeve bearing 28 serves to steady and smooth the rotation. In order to take up wear the bearing bushing 28 is tapered as shown, slotted at 33, and equipped with adjusting nuts 34 and 35 for lengthwise adjustment. A wood shim 36 may be filled in the slot 33 to complete the bearing and allow the necessary takeup. The saddle 26 provides an oil reservoir, and a suitable oil pickup 37 is mounted on the spindle for dipping into the oil and throwing it so that it will train onto the bearings. The saddle 26 has a cross-slide mounting on the carriage 12 so that by turning the screw 38 it may be adjusted transversely of the machine for aligning the spindle with the work-fixture. This adjustment permits the use of different fixtures and work-pieces of different dimensions, thus making the machine universally applicable for connecting rods of different sizes. The Oldham coupling above referred to provides a universally floating drive which serves to eliminate any vibration or directional movement other than the transmission of rotative movement from the spindle to the boring bar. By arranging the spindle and boring bar horizontally and mounting them as disclosed on heavy and substantial bearings, in turn supported on broad flat ways on a comparatively heavy base structure, all vibration is eliminated from the boring bar,—a result which has been difficult to obtain in prior machines. The present arrangement is also particularly advantageous in that the feed is obtained by movement of the fixture carriage as distinguished from certain prior practices in which the boring bar, its spindle and supporting saddle were driven back and forth.

Inasmuch as there are two similar, individual fixtures on the carriage 13, one for each boring bar, a description of one will apply to both. As shown in Figs. 5 and 6 a pin 39 is passed through the wrist-pin bearing in the connecting-rod 41 and the latter is positioned with the ends of this pin seated on V-blocks 42 which form part of the fixture. With this as a locating basis and with the fixture carriage in the loading position the connecting-rod is swung down to a horizontal position in which its crank-shaft bearing 40 is in alignment with the boring bar. A universal saddle is provided for locating and supporting this end of the connecting-rod in such alignment, comprising a yoke 43 pivoted between centers 44 and 45 on the fixture, and end yokes 46 and 47 concentrically pivoted by means of a pin 48 on the yoke 43, the end yokes constituting V-blocks on which the finished bearing flanges 49 are adapted to rest. The bearing 40 is preferably box-cast and machine-finished at its ends, thus providing finished faces adapted to seat on the V-block yokes. By reason of this construction the crank bearing end of the connecting-rod will be automatically and instantly located and supported in axial registration with the boring bar. The connecting-rod is held from displacement by means of a clamping lever 51 fulcrumed at 52 and carrying an equalizing lever 53 which bears down on the connecting-rod adjacent to each end thereof. This downward pressure against the connecting-rod is slight, in fact just sufficient to hold it in location. In the present instance, a rocking lever 54 fulcrumed at 55, Fig. 4, and equipped with a spring-pressed latch 55 is adapted to be swung into the locking position shown in which said latch engages a recess in the lever 51 for locking the latter in position under the slight pressure of the spring 56. This pressure does not distort the connecting-rod; and in fact one of the features of the present invention is the provision, in combination with a diamond-tool boring bar, of a fixture which will not subject the connecting-rod to internal strains and stresses. This fixture serves to locate and hold the crank-shaft bearing end in such position that it will be bored in absolute parallelism with the pin 39.

Mechanism is provided for automatically controlling the rotation of the spindles and the travel of the fixture carriage in a cycle starting with the carriage at rest in a loading position and the spindles likewise at rest. In the present case we employ two separate driving mechanisms, one for the fixture carriage feed and the other for the spindle drive, controlled so that they operate in synchronism. Each mechanism is driven by a separate motor, as it promotes simplicity. It also enables the use of trains, especially inasmuch as the resultant work of these driving trains is a widely different character, the fixture requiring comparatively slow power feed movements and the spindles rotation at a rapid speed such as 1500 R. P. M. and over.

A suitable feed motor and driving train is, therefore, shown in dotted lines in Fig. 1. The motor 56 has a spur pinion 57 which drives a worm gear 58 through the intermediary of gears 59, 61 and 62, the latter two gears being what is known as pick-off gears, adapted to be interchanged or transposed by removal of the cover plate 63 at the front of the machine for the purpose of changing the rate of feed. The worm gear 58 meshes with a worm-wheel 64 loose on a main cam shaft 65 within the main housing. A cam drum 66 fixed to the shaft 65 has a cam groove 67 in which is disposed a roller 68 carried by the fixture carriage. The cam groove is so shaped that by a single rotation of the cam 66 the fixture carriage will be traveled back and forth in a cycle comprising rapid approach, feed, a pause, and quick return movements. This cycle may, however, be varied to suit the particular work or material to be bored. A clutch is provided for connecting the cam shaft 65 to the worm-wheel 64 and for disconnecting it at the end of the cycle. A suitable jaw clutch 69 may be provided for this purpose, this clutch member being splined on the shaft 65 and having teeth adapted to engage with complemental teeth on the worm-wheel 64. Both manual and automatic clutch shifters are provided. As shown in dotted lines in Fig. 2 a shifter fork 71 for the clutch member 69 is fixed to a shaft 72 which is suitably journaled in the frame and extends through to the front and is there equipped with a pivoted hand lever 73. This lever, fulcrumed at 74, has a key end 75 adapted to be moved into and out of a slot 76 in a collar 77 fixed to the front end of a sleeve 78 which is loosely supported on the shaft 72 and has an arm carrying a roller 79 adapted to be actuated by stop cam 81 on the cam drum 66. A suitable spring 82 constantly urges the feed control lever 73 into the position shown in Fig. 2 in which it is connected by the key 75 to the roller arm. A spring 83 connected to the sleeve 78 of the roller arm constantly urges the latter in a clockwise direction, viewing Fig. 1, thus serving to hold the clutch member 69 in connection with the worm-wheel 64 and also holding the roller 79 in the path of the stop cam 81. When a cycle has been completed the clutch 69 will be thrown out by the action of the cam 81, thus instantly stopping the fixture carriage 13 and the feed cam 66. To start the machine for repeating the cycle the operator will swing the control lever 73 in toward the machine, thereby withdrawing the key 75 from the slot 76 and permitting manual shifting of the clutch 69 for engaging it independently of the cam-operated arm.

The spindle driving train starts with a motor 84 mounted at the back of the machine and includes a clutching and braking device for driving the drive pulley 32, above mentioned at a rapid speed and instantly stopping it at predetermined times. The motor drives a silent chain 85 which in turn drives a gear 86 (Fig. 3) fixed to the driving member 87 or a multiple disk clutch. This clutch, of conventional construction, is mounted on a jackshaft 88 suitably journaled in the frame. The driven member 89 of the clutch is keyed to the shaft 88 and adapted to be connected to the driving member by compression of the friction clutch plates. This is a conventional type of clutch and it will suffice to say that the driving and driven members are engaged by shifting the collar 91 to the right, Fig. 3. However, in view of the high speed of rotation, a multiple disk type of clutch is especially desirable. I also employ a clutch of this type for applying a braking force to instantly stop the rotation of the shaft 88 and consequently of the spindles and boring bars. Upon shifting the collar 91 to the left, Fig. 3, it will frictionally engage the shaft connected member 92 with a stationary member 93 fixed to the frame, thus stopping the shaft 88. The collar 91 is adapted to be operated by a shifter lever 94, in turn operated by a control cam 95 fixed to the main cam shaft 65. The lever 94 has a roller 96 located in a cam groove 97 in the cam 95, said groove being so shaped as to shift the collar 91 at predetermined times with relation to the travel of the fixture carriage for starting and stopping the boring tools. The drive pulley 32 which is fixed to the jack-shaft 88 has two sets of belt grooves, one set for the belts 31 which drive the pulley 29 on one of the spindles and the other set 98 for driving the pulley on the other spindle. These belts are preferably of a rubber texture which gives a silent, resilient drive especially well suited for the high speeds here involved. A suitable take-up pulley (not shown) may be used in connection with each set of belts to keep them taut.

The operation is as follows: Assuming that the machine is at rest at the end of its cycle above described, the fixture carriage 13 will be approximately in the dotted line position 99, Fig. 1, in which position the pilot end 19 of the boring bar is entirely withdrawn from the work-piece, thus allowing the finished connecting-rod to be removed or a new one inserted. This is the loading position, and after the operator has loaded both fixtures in the manner above described he will start the machine by swinging the hand lever 73 in toward the machine and then to the right to engage the starting clutch 69. This starts the fixture carriage through its cycle, commencing with the rapid approach movement, at the end of which or at a suitable time the friction clutch 87—89 will be automatically engaged for rotating the boring bars. The fixture carriage will then be reduced to a slow constant feed, during which the diamond points bore the bearings from end to end. After the diamond tools have entirely cleared the bearings the fixture carriage will pause, and at this time the brake clutch 92—93 will be engaged to stop rotation of the boring bars. While the boring tools are at rest the fixture carriage will be returned in a comparatively quick movement to the starting position, whereupon the carriage feed drive will be stopped by the action of the cam 81, as above described.

It should be noted that the parts are so arranged and the driving trains so constructed as to eliminate vibration either in the boring bars or in the work fixture, thereby to control the diamond boring tools to a high degree of accuracy and precision. While the separate drives and the character of the driving trains contribute to this end, a most important factor and one which we consider a salient feature of the invention is the horizontal arrangement of one or more spindles and the horizontally moving work fixture. This arrangement promotes stability and steadiness and is an advance in machines of this type over those having a stationary work fixture and a vertically moving spindle saddle and boring tool. Another feature of importance is the manner in which the boring bar is mounted and driven. It will be observed that the boring bar has a long sleeve bearing in both the front and rear of the diamond boring tool, thus providing large bearing surface and control of the bar such as does not permit of the slightest lateral deflection. By employing a driving spindle mounted and driven as disclosed, and connecting this spindle to the boring bar through the agency of an Oldham coupling, or the equivalent, we have eliminated from rotation of the boring bar any vibration or any directional pressures other than strictly in the direction of rotation.

Another important advantage of our machine is that the connecting-rod is so supported, regardless of irregularities or variances in its shape or in the bushing, that the resultant bore as finished by the diamond-tool will not only be true round, but will be absolutely parallel with the bore through the wrist pin bearing. This is a result which, so far as we are aware, has not been attained in production operation with prior machines designed for this purpose.

In view of the high speed of rotation of the boring bars we have aimed to prevent breakage or injury such as might be occasioned by the boring bars "freezing" or jamming in the fixture, and to this end the spindle carriage 12 is secured to the ways 11 with just sufficient frictional pressure as to allow this carriage to be backed along the ways in the event that excessive pressure is encountered during feed or travel of the fixture carriage.

For purpose of illustration we have described our invention as applied to a diamond-tool boring machine; but it should be expressly understood that in the practice of our invention certain phases and combinations thereof may be applied to boring machines in general, and that changes may be made in the construction and details of the mechanisms without departing from the spirit and scope of the invention as expressed in the appended claims, in which—

We claim:

1. A diamond-tool boring machine comprising a spindle carriage in a fixed position equipped with a rotary spindle, a fixture carriage mounted to travel toward and from the spindle carriage, a boring bar connected to said spindle and equipped with a high-speed cutter, a sleeve bearing on the fixture carriage for said boring bar, a work holder on the fixture carriage for holding a work-piece in a position to be bored, a cam drum connected with the fixture carriage for moving it in feed and return movements, a driving train for rotating the spindle including a driving clutch and a brake, and means operated in timed relation with the cam drum for controlling said clutch and brake in synchronism with the operation of the fixture carriage whereby to stop rotation of the spindle at the end of the feed movement for holding it in such condition during the return movement.

2. A boring machine as set forth in claim 1, including a drive motor and reduction gearing therefrom to said cam drum for rotating the latter, and a separate drive motor for the spindle driving train.

3. A diamond-tool boring machine comprising a frame having horizontal ways, a spindle carriage mounted in a fixed position on the frame at one end of said ways, a fixture carriage mounted to slide on said ways toward and from the spindle carriage, a pair of spindle saddles mounted on the spindle carriage spaced transversely of the machine and individually adjustable transversely thereof, a spindle journaled in each saddle, a boring bar for each spindle, sleeve bearings on the fixture carriage in which the boring bars are guided, individual work holders on the fixture carriage for holding work-pieces in position to be bored, means for rotating the spindles at a high speed, means for moving the fixture carriage in feed and return movements, and means including a brake for stopping the spindles from rotation at the end of the feed movement and holding them in such condition during the return movement.

4. A boring machine of the character described, comprising a frame having horizontal ways, a stationary spindle carriage upon said ways, a rotary spindle positioned upon said carriage, bearings for said spindle in said carriage at least one of which is arranged to permit frequent adjustment thereof to cause the same to closely fit the rotating spindle and cause it to run true at all times, a fixture carriage mounted to travel toward and from the spindle carriage, a boring bar connected to said spindle and equipped with a high speed cutter, a work-holder on the fixture carriage for holding a work-piece in a position to be bored, means for moving the fixture carriage in feed and return movements, a driving train for rotating the spindle including a driving clutch and a brake, and means operated in time relation with said fixture carriage for controlling said clutch and brake in synchronism with the operation of the fixture carriage whereby to start rotation of the spindle at the beginning of the feed movement, stop rotation of the spindle at the end of the feed movement and hold it from rotation during the return movement.

5. In a boring machine as set forth in claim 3, in which the spindle rotating means comprises a jack-shaft journaled on the frame parallel with the spindles, said brake being concentric therewith and having a member connected thereto, a clutch concentric with the jack-shaft having a member connected thereto, means for driving the other member of the clutch at a high speed, means for engaging either the clutch or the brake device to drive the jack-shaft at a high speed or to hold it from rotation, a pulley fixed to the jack-shaft, a pulley fixed to each spindle, and a belt connection between the drive pulley and each spindle pulley.

6. A boring machine as set forth in claim 3, in which the spindle driving means comprises a drive pulley, a pulley fixed to each spindle, a belt connection between the drive pulley and each spindle pulley, and means for driving the drive pulley including a clutch for connecting and disconnecting the drive, said brake being arranged to stop the drive pulley when the drive has been disconnected.

In witness whereof we have hereunto affixed our signatures.

JOHN S. BARNES.
RALPH B. BILLINGHAM.

CERTIFICATE OF CORRECTION.

Patent No. 1,880,666.  October 4, 1932.

JOHN S. BARNES ET AL.

It is hereby certified that error appears in the printed specification of the above numbered patent requiring correction as follows: Page 5, lines 4 and 30, claims 1 and 3, respectively, strike out the word "diamond-tool" and after the word "machine" in the same lines, insert the words "of the character described"; and line 69, claim 4, for "time" read "timed"; and that the said Letters Patent should be read with these corrections therein that the same may conform to the record of the case in the Patent Office.

Signed and sealed this 20th day of December, A. D. 1932.

(Seal)

M. J. Moore,
Acting Commissioner of Patents.